Patented Jan. 22, 1952

2,583,436

UNITED STATES PATENT OFFICE 2,583,436

HEAVY-DUTY LUBRICATING GREASE

Arnold J. Morway, Rahway, N. J., and Earl W. Ball, New Rochelle, N. Y., assignors to Standard Oil Development Company, a corporation of Delaware No Drawing. Application December 1, 1949, Serial No. 130,608

4 Claims. (Cl. 252—33.2)

This invention relates to an improved heavy duty lubricating grease particularly a lubricating composition which is especially suitable for heavy machinery such as heavy automotive chassis elements, large gears, and other machine parts operating at relatively high speeds and/or under high unit pressures, and especially where elevated temperatures may be encountered. More specifically, the present invention relates to a new and unique grease type lubricant which combines a metal soap thickener dispersed in a liquid lubricant which comprises a substantial proportion of an asphaltic residuum of high viscosity, and relatively high adhesivity or tackiness, the composition having a solid grease-like consistency without being unduly hard at lower temperatures. The finished product is a solid, firm grease of relatively high melting point and high shear stability. It has properties which make it particularly suitable for the type of service mentioned above where long life lubrication must be accomplished under conditions where ordinary greases or oils would be inadequate. The product has shown unusual merit as a chassis lubricant for heavy duty equipment, such as automotive trucks, busses, and earth moving machinery, even during hot weather, where lubricants commonly used in the prior art have leaked out or have become ineffective after a period of time. The present application is a continuation-in-part of our copending application Serial No. 9,314, filed February 18, 1948, now abandoned.

In the prior art, lubricants designed for heavy duty service, for example, lubricants for heavy automotive chassis elements, and for heavy and relatively large and rough gears, have commonly consisted of soap thickened oils of true grease consistency which lack adhesivity, or have consisted of asphaltic residua cut back to an appropriate or desired viscosity or consistency with a suitable thinner, such as mineral lubricating oil. The grease products, e. g., soda soap greases or calcium greases, have usually given good service at normal temperatures where unit loads have not been too great. On the other hand, the heavy asphaltic oils or "greases," which do not have a grease consistency at all, may lubricate heavy gears effectively over a moderate temperature range but, since they are not true solids but rather viscous fluids, they tend to run off the gears and other machine parts which are to be lubricated as temperatures are increased. This tendency to run off gearing, or to drip away from chassis bearings, and the like, increases greatly as the temperature rises, due to the relatively poor temperature-viscosity relationship of asphaltic oil or grease products. The prior art lubricants of this type, in general, have very low viscosity index characteristics, which are typical of asphaltic compositions, and they thin out excessively upon rise in temperature. The poor viscosity-temperature relationship of prior art asphaltic lubricants not only makes them somewhat unsatisfactory under conditions where temperatures tend to rise considerably but they are also unsuitable for low temperature use. At low temperatures, these asphaltic lubricants tend to become brittle and to chip off the surfaces of gears or other metal elements on impact, thus leaving the surfaces which should be protected devoid of lubricant.

It has also been suggested in the prior art that a grease for heavy mill gears can be prepared of a lead and soda base. Lead soap can be reacted with sodium hydroxide to form a complex soap which combines lead oxide and sodium hydroxide with fatty oil. In the patent to Swenson, #2,295,189, this suggestion is further amplified by the teaching that a heavy oil residuum may be used in combination with a relatively light oil in the soda-lead grease for high temperature use. The grease of the present invention bears some similarity to the Swenson product, but it does not involve a complex soap, nor does it have the same load bearing properties or resistance to leakage. According to the present invention, lead oleate is combined in a product which contains a high grade soda base grease. The product includes a dispersing agent for the soda soap which stabilizes this soap throughout the relatively heavy asphaltic constituent.

The product of the present invention has a further marked advantage over certain prior art products. While it is relatively water insoluble and is adequately resistant to water leaching of the soda soap, it will emulsify small quantities of water without decomposition. For this reason it will take up minor quantities of water which are unabsorbed in a completely waterproof grease. This distinctly improves the rust inhibiting properties of the product.

While greases have been prepared previously with a combination of soda soap and lead oleate, these products have almost invariably shown a tendency to break down to semi-fluid products after severe mechanical working. The product of the present invention, which combines these ingredients with a dispersing agent (oil-soluble metal sulfonate) and with a viscous oxidized asphalt plus a relatively thin lubricating oil, appears to be unique in this respect. It has excellent structure stability to long mechanical working and does not break down to a fluid consistency under the high shearing stresses of meshing gears under high loads. It withstands the severe grease worker tests without structural breakdown.

One important application of lubricants of this general type is in the lubrication of heavy automotive vehicle chassis. Another is the lubrication of the traction gear trains of certain types of railway locomotives, such as diesel electric engines. In such engines the traction gear train from the driving motor to the driving wheels is usually encased and filled with a heavy duty gear lubricant. As a rule the gear casing is not liquid tight and cannot conveniently be made so because of necessary tolerances for manufacture and operation. Also, in the operation of heavy railway equipment at very high speeds, heavy objects are frequently picked up from railway road beds and caused to strike the gear casings with such force as to batter and puncture them. In these applications the prior art lubricants mentioned above, which are liquid at elevated temperatures, consequently have required frequent inspection and replenishment because the action of the mechanical elements and the vibration inherent in such mechanisms tend to squeeze out or throw out the lubricant through bearing ends, worn spaces, or small openings or crevices in gear cases and the like.

During at least a major part of the year, the normal operating conditions of heavy automotive and railway equipment result in sufficient temperature rise that the prior art asphaltic lubricants become highly liquid and are very readily lost. In fact, experience has shown that "greases" (rather, stiff oils) of this type are frequently lost completely between the regular periodic inspections which are required. Such loss before replenishment inevitably results in abnormal wear of shackles, bearings, gear teeth and the like, due to inadequate lubrication. Although frequent inspections, for example, weekly, bi-weekly, or monthly, are usually required for such important equipment as heavy trucks, busses, diesel electric locomotives, etc., there have been relatively numerous and often serious mechanical failures due to the loss of lubricant. Such failures of course involve expensive replacements and often result in serious and expensive loss of service of the equipment.

The asphaltic type lubricants of the prior art, and likewise the soda base, lime base, and other greases based on oils of moderate viscosity, have been widely used in heavy duty equipment. Where the conditions of use are such as to result in wide variations in operating temperature and in unit loads, the relatively liquid asphaltic lubricant is not satisfactory. By using extreme pressure compositions, higher unit loads on shackles, springs, bearings, gears, and the like, may be tolerated. By a careful selection of ingredients, the other requirements may also be met quite adaquately. It is the primary object of the present invention to make available a lubricant which more fully meets the requirements of the type of heavy duty service mentioned above.

The present invention is based upon the discovery that a lubricant may be devised which will retain its grease-like or solid body at high temperatures and also will retain other desirable characteristics such as adhesiveness and resistance to ready displacement from lubricating position at elevated temperatures. At the same time the composition of the present invention does not become brittle at low temperatures to the extent that it fails to give adequate lubrication. It does not liquefy so as to be readily lost out of springs, shackles or gear cases having small openings therein, and it is an effective lubricating medium for varied heavy duty service over a wide range of temperatures.

The lubricant of the present invention preferably consists of about 30 to 60% by weight of a suitable asphaltic residuum having a viscosity of about 1000 to 5000 S. S. U. at 210° F., 20 to 50% of a suitable mineral lubricating oil of lighter viscosity, e. g., 35 to 300 S. S. U. at 210° F., 8 to 18% of a suitable soap, preferably a sodium soap of rapeseed oil though other soaps of fatty acids such as sodium stearate, calcium stearate, and similar metal soaps of related $C_{12}$ to $C_{22}$ fatty acids, may be used. The composition also includes about 1 to 15% of an extreme pressure additive. Various alkali or alkaline earth metal soaps or mixtures thereof, may be used but the soda soap of rapeseed oil appears to be most satisfactory because of its good stable properties at relatively high temperatures. Lead oleate is preferred as the extreme pressure agent, preferably in proportions of about 7 to 12%, especially about 10%, though larger or smaller proportions may be used. For some purposes additional and more potent extreme pressure additives may be desirable, e. g. chlorinated and/or sulfurized fatty oils, hydrocarbons, phosphor compounds, and the like. It is desirable also, to use a small amount, for example 0.1 to 1%, preferably about 0.2%, of an oil soluble sulfonate such as oil soluble sodium sulfonate, especialy sulfonates of relatively high molecular weight (preferably 450 or more) derived from petroleum fractions by drastic treatment with strong sulfuric acid and the like. The grease should remain solid at least up to 250° F.

The lubricant of the present invention has additional advantages of retaining its body under high shearing rates as well as possessing sufficient load-carrying properties. Hence it retains structure stability under severe operations. The composition is provided with sufficient extreme pressure properties to protect satisfactorily the heavily loaded chassis parts of busses and trucks, as well as the major transmission gears of diesel electric locomotives and comparable mechanical equipment.

As an example of the present invention, one composition was prepared having the following ingredients:

EXAMPLE I 8.8% rapeseed oil
1.90% caustic soda
29.10% low cold test mineral oil of 50 secs. viscosity at 210° F.
0.20% sodium sulfonate (mol. wt. 450 to 500)
40.00% asphaltic residuum of 2500 S. S. U. viscosity at 100° F.
20.00% lead oleate concentrate (50% mineral oil)

The composition recited above was prepared by charging the rapeseed oil, sodium sulfonate, and ⅓ of the low cold test mineral oil to a grease-making kettle. This mixture was first heated to a temperature of 150° F. and thereafter the caustic soda in a 30 to 40% aqueous solution was added, being stirred into the mixture to saponify the rapeseed oil. Thereafter the temperature was raised slowly to 300° F. to complete the saponification and evaporate the water. After the water had been completely evaporated, the remainder of the low cold test mineral oil was added. After addition of the oil, the temperature was raised further to 500° F. and the heating was then discontinued. The cold asphaltic residuum was next added to the heated mixture, resulting in a lowering of the temperature of the composition to a point between 250° and 300° F. Thereafter the temperature was further lowered to about 225° F. and the lead oleate concentrate was added. The material was then ready for immediate packaging without further cooling. It was of solid grease consistency at ordinary temperatures and up to at least 210° F. or higher. The quantity of rapeseed oil and saponifying agent used in this example is about an optimum for diesel-electric locomotive service.

A composition employing about the maximum quantity of soap is prepared from the following ingredients:

EXAMPLE II 15.0% rapeseed oil
3.2% caustic soda
31.6% mineral oil, 50 S. S. U. at 210° F.
0.2% sodium sulfonate (mol. wt. about 450–500)
30.0% asphaltic residuum, 2500 S. S. U. at 100° F.
20.0% lead oleate concentrate (50% mineral oil)

EXAMPLE III

For purposes of comparison a typical prior art asphaltic residuum type lubricant was tested and also a modified soap thickened residuum lubricant was prepared as Example IV.

EXAMPLE IV

Example IV consisted of about 12% sodium stearate, 20% lead oleate concentrate, 13% mineral oil of Mid-Continent crude having a viscosity of 180 S. S. U. at 210° F. and 55% of the asphaltic residuum of 2500 S. S. U. viscosity at 100° F. The percentages given refer to weight percentages.

The material of the present invention as described in the first of the above examples and the two comparable test compositions of Examples III and IV were tested for viscosity, A. S. T. M. dropping point, worked penetration at 77° F., extreme pressure characteristics, and asphaltic consistency. The results of such tests are tabulated in Table I.

shown by the asphalt consistency test. On the other hand, larger quantities of soap may be used than those given above with satisfactory results. Quantities may be employed as high as 15%, or more, of the total composition, but although these will operate satisfactorily they materially increase the cost of the lubricant, without giving improved performance.

EXAMPLE V

A grease was prepared by combining 40% by weight of a high grade soda-rapeseed oil soap thickened mineral oil, 40% of a viscous asphaltic gear lubricant, and 20% of a lead oleate concentrate (50% lead oleate in mineral oil of lubricating grade). This product gave exceptionally good service in the chassis lubrication of busses in regular transit service in one of the major southern cities during summertime.

It will be understood that the preferred composition of the present invention comprises a substantial proportion of suitable asphaltic residuum and also a substantial quantity of mineral oil, usually somewhat but not greatly less than the quantity of residuum, a thickening soap which does not have extreme pressure properties, and an appropriate extreme pressure additive, lead oleate being preferred although other common and well-known extreme pressure additives may be employed.

The sodium soaps of vegetable oils, especially rapeseed oil, are preferred because of their desirable high temperature properties. In heavy duty gear service, as required on diesel electric locomotives, the water resistance properties of grease or lubricant are not as important as in some other types of operation. The sodium soaps, as is well known, are not as resistant to the leaching action of water as are some of the other soaps, such as calcium or lithium soaps, but their high temperature properties are superior. Under conditions where water resistance is more important, soaps other than the sodium soaps may be employed with fairly satisfactory results. However, the asphaltic residuum of this in- Table I

| Tests | Example I | Example III | Example IV |
|---|---|---|---|
| S. S. U. Viscosity at 210° F | Solid (no flow). | 2,131 | Solid (no flow). |
| ASTM Dropping Point, ° F | 370 | 113 | 292. |
| ASTM Worked Penetration at 77° F | 276 | ¹ 376 | 331. |
| Worked Penetration after 100,000 strokes ¹⁄₁₆″ hole worker plate. | 292 | | Semi-fluid. |
| Almen Extreme Pressure Lubricant Test, pounds carried. | 6,000 | 6,000 | 5,000. |
| Asphalt Consistency Test (210° F.)— Float and Plug Method: Time to Sink Float (Seconds). | 10,800 | 20 | 414. |

¹ Not a true penetration, since viscosity of material floats cone.

In Example I the finished composition contained between 9 and 10% of sodium soap of rapeseed oil. This quantity appears to be about an optimum but a somewhat lesser quantity may be employed if desired. We have found, however, that the quantity of sodium soap should not be materially less than about 8% by weight based on the total composition. Any amount materially less than 8% results in lower dropping or melting points of the grease permitting the composition to liquefy at moderately high operating temperatures with resultant loss, such as is typical of the non-soap thickened asphaltic residuum type lubricants of the prior art. The use of less soap also results in considerably lower viscosity as vention tends to waterproof even the sodium soaps and prevents leaching quite effectively. There is a distinct advantage in having the grease sufficiently water absorptive that it will take up the small rust-forming quantities of water that collect by condensation in gear cases.

In general, asphaltic residuum is desirable because of its good adhesive properties. Heavy gears operating under high pressures appear to require a very adhesive type of lubricant which is not too easily thrown off by centrifugal force. At the same time, it is important as noted above, to use a lubricant which will not become too liquid at elevated temperatures nor to brittle at lower temperatures. The grease of this invention combines these properties in a very satisfactory degree.

Gear housings usually should be vented to allow breathing and avoid the objectionable sweating which, particularly if traces of moisture are present, causes damage to the gear teeth surfaces. This is a further reason for the use of a soap-thickened lubricant which will not be thrown out of the vents as liquid lubricants are. The use of a soap, preferably a soda soap, to maintain a grease structure in the lubricant and prevent liquefying thereof is essential wherever liquid lubricant would soon be lost from gear housings or other mechanical parts.

Because of the fact that there is nearly always a small amount of moisture present, particularly in gear housings, roller bearings, and the like, the use of about 0.05 to 1%, preferably about 0.2%, of a rust inhibitor, such as an oil soluble sodium petroleum sulfonate or other similar alkali or alkaline earth sulfonate, is considered very desirable. Other known corrosion inhibitors, such as partial esters of polyhydric alcohols, for example, may be used with or in lieu of the sulfonate, but sodium sulfonate usually is preferred. The sulfonate is preferably added after the grease has been cooled down from its maximum temperature to avoid the formation of a complex with the soap of fatty acids. It may best be added after the asphaltic residuum is added.

The quantity of the lead soap extreme pressure additive may be varied within wide limits, depending upon the use to which the grease is subjected. In general, for heavy duty gear or chassis service as on heavy machinery such as locomotives, trucks, busses, road machinery, and the like, sufficient quantities of the extreme pressure additive should be employed to carry the required loads as suggested above. In general, the quantity of extreme pressure additive, preferably lead oleate for the present purpose, will be between 1 and 15% by weight, preferably 6 to 12%, based on the total composition 10% by weight (usually added as 20% of a 50-50 mineral oil solution), seems to be about optimum for general usage.

A series of tests were conducted in one of the larger southern cities during the summer time, using a fleet of transit busses. Among six competitive greases, used as chassis lubricants, the specific composition of this invention (Example IV) gave the best results. Test results are given in the following table. Some of the other products tested were other products of applicants' assignee and still others were products of competitors.

from 10,260 to 18,800 pounds, of various standard manufacture. The busses were lubricated regularly at 1000 mile intervals, the time intervals varying from 5 to 13 days. Temperatures during the test period varied from a low of 78° F. to a high of 104° F. Grease C, a good quality oil and soda soap grease, showed a pronounced tendency to emulsify and break down under wet conditions which was not so with the grease of Example V, although both were soda base greases. The grease "F" was a semiliquid product, and was not suitable for use where leakage is possible.

The above tests show that the composition of the present invention has excellent properties for heavy duty chassis lubrication as well as for the lubrication of heavy duty gears and the like. The grease is only moderately firm in consistency and hence can be readily handled and dispensed in ordinary dispensing equipment in contrast to conventional heavy gear lubricants which are highly viscous in texture and very hard to dispense. At the same time it remains in place and performs its lubrication functions satisfactorily under adverse temperature and moisture conditions, which is not true of the relatively non-adhesive straight soda base greases or other conventional lubricants.

It will be understood from the foregoing that the present invention differs from prior art compositions in using a light oil to thin out the asphaltic residuum to a considerable extent and then adding a sufficient quantity of a soap, preferably a soda soap of a vegetable oil which will produce a stable high temperature grease, to substantially solidify the lubricant and maintain such solidity at high operating temperatures. Such a grease does not freeze up and become brittle at low temperatures, even below 0° F., such as may be encountered in winter railroad or bus or truck operations, nor does it liquefy so as to be thrown off the gears or lost from the gear case at moderately high operating temperatures, e. g., temperatures of 250° F.

It will be obvious that various conventional additives may be incorporated in the greases of this invention as will be apparent to those skilled in the art. Thus, antioxidants, rust inhibitors, viscosity index improvers, tackiness agents, polymeric thickeners and the like, may be added for particular purposes without departing from the spirit of the present invention.

What is claimed is:

1. A lubricating grease composition consisting essentially of about 30 to 40% by weight of asphaltic residuum, of between 1000 and 5000

*Table II*

HEAVY DUTY CHASSIS LUBRICANT FIELD TESTS

| Composition | Soap | | Worked Penetration at 77° F. | Viscosity Base Oil S. S. U. @ 210° F. | Extreme Pressure Additive | Handling | Retention in Mechanism |
|---|---|---|---|---|---|---|---|
| | Per Cent | Type | | | | | |
| Ex. V | 8.8 | Soda | 340 | 220 | Pb. Oleate | Satisfactory | Exc. |
| A | 10.5 | Lime | 330 | 105 | Pb. Oleate and Chlor. Wax. | do | Good. |
| B | 12.3 | do | 280 | 72 | None | do | Do. |
| C | 6.3 | Soda | 450 | 190 | do | Messy | Fair. |
| D | 9.7 | Alum | 330 | 68 | do | Satisfactory | Do. |
| E | 7.2 | do | 303 | 68 | do | Very Messy | Poor. |
| F | 1.9 | Soda | ¹ 567 | 130 | Pb. Oleate | do | Very Poor. |

¹ SIL Mobilometer Consistency.

The vehicles used in the foregoing tests were busses of 27 to 44 passengers capacity, weighing S. S. U. viscosity at 100° F., about 10% of lead soap as an extreme pressure additive, about 8 to 18% sodium soap of rapeseed oil, about 0.05 to 1% of an oil soluble petroleum sulfonate as a rust inhibitor, the remainder of the composition being mineral base lubricating oil of 35 to 300 S. S. U. viscosity at 210° F.

2. A normally solid and viscous heavy duty gear lubricant composition which does not become brittle at temperatures as low as 0° F. nor liquid at temperatures as high as 250° F., consisting of about 40% by weight of an asphaltic residuum of about 2500 S. S. U. viscosity at 100° F., about 30% of low cold test mineral oil having a viscosity of about 50 S. S. U. at 210° F., 20% of a 50% lead oleate concentrate in mineral oil, about 10% of a sodium soap of rapeseed oil and about 0.2% of oil soluble sodium petroleum sulfonate of about 450 to 500 molecular weight as an anti-rusting agent.

3. The process of preparing a solid adherent lubricating grease composition which remains solid and non-brittle over a wide temperature range, which comprises preparing in mineral lubricating oil of low cold test and of viscosity between 35 and 200 S. S. U. at 210° F., a sodium soap of rapeseed oil in proportions of between about 8 and 18% by weight of said soap, based on the total composition, heating said oil and soap to a temperature substantially higher than 210° F., to evaporate water of saponification, heating still further to a temperature of the order of 500° F., adding asphaltic residuum at lower temperature in sufficient quantity to lower the composition temperature to at least as low as 300° F., and thereafter adding about 1 to 15% of a lead soap as an extreme pressure agent so as to avoid formation of a soda soap-lead soap complex.

4. Process as in claim 3, which comprises incorporating 0.05 to 1% by weight, based on the total composition, of an oil soluble metal petroleum sulfonate after adding the asphaltic residuum.

ARNOLD J. MORWAY.
EARL W. BALL.

REFERENCES CITED

The following references are of record in the file of this patent:

UNITED STATES PATENTS

| Number | Name | Date |
| --- | --- | --- |
| 1,699,961 | Finlay | Jan. 22, 1929 |
| 1,989,196 | Hilliker | Jan. 29, 1935 |
| 2,086,870 | Hilliker | July 13, 1937 |
| 2,211,921 | Brunstrum et al. | Aug. 20, 1940 |
| 2,265,791 | Zimmer et al. | Dec. 9, 1941 |
| 2,295,189 | Swenson | Sept. 8, 1942 |
| 2,455,892 | Fraser | Dec. 7, 1948 |
| 2,457,582 | McCarthy | Dec. 28, 1948 |